United States Patent Office 3,255,198
Patented June 7, 1966

3,255,198
CERTAIN SULFAMYL-BENZISOTHIAZOLE COMPOUNDS
John B. Bicking, Lansdale, and Frederick C. Novello, Berwyn, Pa., assignors to Merck & Co., Inc., Rahway, N.J., a corporation of New Jersey
No Drawing. Filed Oct. 17, 1960, Ser. No. 62,889
15 Claims. (Cl. 260—301)

This invention is concerned with novel 1,2-benzisothiazole-1,1-dioxides which contain a sulfamyl substituent attached to the benzenoid portion of the nucleus and is concerned additionally with the 2,3-dihydro derivatives thereof. The benzisothiazole compounds of this invention can contain solely the sulfamyl group attached to the benzenoid portion of the nucleus or the benzenoid portion of the nucleus can be additionally substituted with halogen such as chlorine, bromine, fluorine, and the like, lower alkyl advantageously having from 1–5 carbon atoms, lower alkoxy also preferably having from 1–5 carbon atoms and nitro or amino groups. The 3-position carbon atom of the benzisothiazole nucleus also can either be unsubstituted or it can carry a substituent such as a lower alkyl, aryl, such as phenyl, or an aralkyl such as phenyl-lower alkyl substituent.

The novel benzisothiazole compounds of this invention are useful pharmacotherapeutic agents particularly because of their diuretic, natriuretic and/or saluretic properties (hereinafter referred to as diuretic properties). The diuretic properties of the novel compounds of this invention make them particularly useful in the treatment of congestive heart failure or other abnormalities which produce an edematous condition in the body, or which produce an imbalance in the electrolyte concentration in the body as, for example, those in which abnormal retention of sodium occur. The compounds can be administered in therapeutic dosages in conventional vehicles as in the form of tablets, pills, capsules and the like as they are effective upon oral administration.

The novel benzisothiazoles of this invention can be prepared from sulfamylsaccharin compounds by treatment with a Grignard reagent which forms a 3-$R^1$-sulfamyl-1,2-benzisothiazole-1,1-dioxide wherein $R^1$ represents a substituent group other than hydrogen. These compounds then can be reduced catalytically to the 2,3-dihydro derivative. Alternatively, the 2,3-dihydro compounds can be prepared directly from the sulfamylsaccharin compounds by reduction with lithium aluminum hydride.

The process employing the Grignard reagent advantageously is carried out in the presence of tetrahydrofuran which provides a good solvent medium for the reactants, and with slight warming. An excess of the Grignard reagent advantageously is employed in the reaction.

Reduction of the benzisothiazole to the 2,3-dihydro derivative advantageously is carried out in the presence of platinum and should a group be attached to the benzenoid nucleus which will also be reduced, such as a nitro group, the corresponding 2,3-dihydro compound will be prepared with the reduced substituent attached to the benzenoid moiety.

Reduction of the sulfamylsaccharin compounds with lithium aluminum hydride is readily effected by warming the reaction mixture to produce the desired 2,3-dihydro compounds.

The sulfamylsaccharin compounds used as starting materials in either one of the above processes can be prepared by chlorosulfonation of toluene or a substituted toluene compound. Chlorosulfonation advantageously is effected with chlorosulfonic acid to yield the toluene-disulfonyl chloride derivative which then is converted to the disulfamyl derivative by treatment with ammonia. The disulfamyl-toluene compound then is oxidized for example with potassium permanganate, or a chromic anhydride-sulfuric acid mixture and the like, to convert the methyl group to a carboxyl group and the resulting disulfamylbenzoic acid compound is cyclo-dehydrated, advantageously by heating to the melting point of the disulfamylbenzoic acid or by mixing the disulfamylbenzoic acid with sulfuric acid at room temperature or by heating a mixture of the disulfamylbenzoic acid and phosphoryl chloride preferably on a steam bath, to give the desired sulfamyl-saccharin compound.

While the above discussion outlines general methods suitable for the preparation of the novel compounds of this invention, it is to be understood that the described methods and the following examples, which more fully describe the preparation of the compounds of this invention, are illustrative of the methods which can be employed for the preparation of the novel compounds and are not to be construed as limiting the invention to the particular methods or the particular compounds specifically described.

Example 1.—5-chloro-3-ethyl-6-sulfamyl-1,2-benzisothiazole-1,1-dioxide

Step A.—m-Chlorotoluene (31.8 g.) is added dropwise over a period of 15–20 minutes to 165 ml. of chlorosulfonic acid cooled in an ice bath. After heating the reaction mixture at 150–160° C., for three hours, the solution is cooled in an ice bath and then poured onto ice. The solid is collected on the filter, washed with water, and added portionwise to 150 ml. of 28% ammonium hydroxide cooled in an ice bath. The reaction mixture then is heated on the steam bath for two hours after which the mixture is cooled and the product which separates is collected on the filter and recrystallized from aqueous alcohol yielding 5-chloro-2,4-disulfamyltoluene, M.P. 256–257° C.

Step B.—A solution of 4.9 g. of the thus obtained product in 125 ml. of 5% aqueous sodium hydroxide is heated on the steam bath with 8.8 g. of potassium permanganate with stirring for 30 minutes. The mixture is filtered, acidified with dilute hydrochloric acid, and concentrated to dryness in vacuo. Recrystallization of the residue from water yields 5-chloro-2,4-disulfamylbenzoic acid, M.P. 200° C. (dec.).

Step C.—A solution of 8 g. of the above obtained product in 25 ml. of concentrated sulfuric acid is allowed to stand at room temperature for one hour. Cold water (100 ml.) is added and the precipitate collected on the filter and recrystallized from 50% alcohol-water to give 5-chloro-6-sulfamylsaccharin, M.P. 273–275° C. (dec.).

Step D.—A solution of ethylmagnesium bromide in 40 cc. of tetrahydrofuran is prepared using 7.1 g. (0.065 mole) of ethylbromide and 1.46 g. (0.06 mole) of magnesium. A solution of 4.45 g. (0.015 mole) of 5-chloro-6-sulfamylsaccharin, obtained as described above, in 35 cc. of tetrahydrofuran is added dropwise during 20 minutes. The mixture is kept at 30° C. during the addition and then refluxed for one hour. The mixture then is poured into 250 cc. of cold water, reduced to about one-third volume by means of vacuum distillation, made strongly basic by the addition of 15 cc. of 40% sodium hydroxide solution and filtered. Crystalline 5-chloro-3-ethyl-6-sulfamyl-1,2-benzisothiazole-1,1-dioxide separates when the solution is acidified and chilled yielding 1.0 g. of produce. M.P. 216–223° C. Repeated recrystallization from aqueous isopropyl alcohol gives analytically pure material, M.P. 241–242.5° C.

*Analysis.*—Calculated for $C_9H_9ClN_2O_4S_2$: C, 35.01; H, 2.94; S, 20.77; N, 9.07. Found: C, 34.92; H, 3.25; S, 20.98; N, 8.91.

*Example 2.—5-chloro-3-ethyl-6-sulfamyl-2,3-dihydro-1,2-benzisothiazole-1,1-dioxide*

5-chloro-3-ethyl-6-sulfamyl-1,2-benzisothiazole-1,1 - dioxide (0.01 mole) is dissolved in about 80 cc. of a 2% solution of sodium hydroxide in water, and hydrogenated at atmospheric pressure at room temperature in the presence of a platinum on charcoal catalyst. After the theoretical amount of hydrogen is absorbed, the catalyst is filtered off and the solution is acidified to precipitate the product which is recrystallized from aqueous ethanol to give 5 - chloro - 3 - ethyl - 6 - sulfamyl - 2,3 - dihydro-1,2-benzisothiazole-1,1-dioxide.

*Example 3.—5-chloro-3-phenyl-6-sulfamyl-1,2-benzisothiazole-1,1-dioxide*

A solution of phenylmagnesium bromide in 45 cc. tetrahydrofuran is prepared from 25.1 g. (0.16 mole) of bromobenzene and 3.9 g. (0.16 mole) of magnesium. A solution of 11.4 g. (0.0385 mole) of 5-chloro-6-sulfamylsaccharin (prepared as described in Example 1, Steps A–C) in 100 cc. of tetrahydrofuran is added dropwise during 20 minutes. The mixture is stirred one hour at room temperature and 2 hours at reflux. It is then poured into 300 cc. of cold water. The mixture is concentrated to 150 cc. by vacuum distillation, and strongly acidified with concentrated hydrochloric acid. The insoluble solid formed is collected and triturated with sodium bicarbonate solution to remove the unreacted saccharin compound. The product, 5-chloro-3-phenyl-6-sulfamyl-1,2-benzisothiazole-1,1-dioxide thus obtained weighs 7.3 g., M.P. 226–240° C. Two recrystallizations from aqueous isopropyl alcohol gives 3.6 g., of analytically pure material, M.P. 257–259° C.

*Analysis.*—Calculated for $C_{13}H_9ClN_2O_4S_2$: C, 43.76; H, 2.54; N, 7.85. Found: C, 43.65; H, 2.63; N, 7.81.

*Example 4.—5-chloro-3-phenyl-6-sulfamyl-2,3-dihydro-1,2-benzisothiazole-1,1-dioxide*

5-chloro-3-phenyl-6-sulfamyl-1,2-benzisothiazole - 1,1-dioxide (4.8 g., 0.013 mole), obtained as described in Example 3, is dissolved in 80 cc. of a 2% solution of sodium hydroxide in water and hydrogenated at atmospheric pressure and room temperature in the presence of a platinum on charcoal catalyst. The theoretical amount of hydrogen is absorbed in about 45 minutes, whereupon the catalyst is filtered off and the solution acidified to precipitate the product. Recrystallization of the product of aqueous ethanol gives 2.8 g. of 5-chloro-3-phenyl-6-sulfamyl-2,3-dihydro-1,2-benzisothiazole-1,1 - dioxide, M.P. 208–209.5° C.

*Analysis.*—Calculated for $C_{13}H_{11}ClN_2O_4S_2$: C, 43.51; H, 3.09; N, 7.81. Found: C, 43.63; H, 3.30; N, 7.80.

*Example 5.—5-chloro-6-sulfamyl-2,3-dihydro-1,2-benzisothiazole-1,1-dioxide*

Lithium aluminum hydride (2.3 g., 0.06 mole) is added to 40 cc. tetrahydrofuran in a flask equipped with stirrer, dropping funnel, and condenser. A solution of 6.0 g. (0.02 mole) of 5-chloro-6-sulfamylsaccharin (prepared as described in Example 1, Steps A–C) in 40 cc. tetrahydrofuran is added during 25 minutes. The mixture is refluxed for 30 minutes and the excess hydride is destroyed by the addition of 10 cc. ethyl acetate followed by 20 cc. water. The mixture then is poured into 200 cc. of water, filtered and concentrated to a volume of 30 cc. Acidification precipitates the solid product which weighs 1.0 g., M.P. 224–235° C. Recrystallization of this product from aqueous isopropyl alcohol gives 0.65 g. of analytically pure 5-chloro-6-sulfamyl-2,3-dihydro-1,2-benzisothiazole-1,1-dioxide, M.P. 243–245° C.

*Analysis.*—Calculated for $C_7H_7ClN_2O_4S_2$: C, 29.73; H, 2.50; N, 9.91. Found: C, 30.04; H, 2.46; N, 9.83.

*Example 6.—5-fluoro-3-ethyl-6-sulfamyl-1,2-benzisothiazole-1,1-dioxide*

By replacing the m-chlorotoluene employed in Example 1, by an equimolecular quantity of m-fluorotoluene and following substantially the same procedure described in Example 1, Steps A through D, there is obtained 5-fluoro-3-ethyl-6-sulfamyl-1,2-benzisothiazole-1,1-dioxide.

*Example 7.—5-fluoro-3-ethyl-6-sulfamly-2,3-dihydro-1,2-benzisothiazole-1,1-dioxide*

An alkaline solution of 5-fluoro-3-ethyl-6-sulfamyl-1,2-benzisothiazole-1,1-dioxide is catalytically reduced by substantially the same procedure as described in Example 2 to yield 5-fluoro-3-ethyl-6-sulfamyl-2,3-dihydro-1,2-benzisothiazole-1,1-dioxide.

*Example 8.—5-bromo-3-benzyl-6-sulfamyl-1,2-benzisothiazole-1,1-dioxide*

By replacing the m-chlorotoluene employed in Example 1 by an equimolecular quantity of m-bromotoluene, and following substantially the same procedures described in Example 1, Steps A through C, there is obtained 5-bromo-6-sulfamylsaccharin. This compound then is reacted with the Grignard reagent, benzylmagnesium bromide, in tetrahydrofuran by substantially the same method described in Example 1, Step D, to yield 5-bromo-3-benzyl-6-sulfamyl-1,2-benzisothiazole-1,1-dioxide.

*Example 9.—5-bromo-3-benzyl-6-sulfamyl-2,3-dihydro-1,2-benzisothiazole-1,1-dioxide*

The 5-bromo-3-benzyl-6-sulfamyl-1,2-benzisothiazole-1,1-dioxide obtained as described in Example 8 is reduced by substantially the same procedure described in Example 2 to give 5-bromo-3-benzyl-6-sulfamyl-2,3-dihydro-1,2-benzisothiazole-1,1-dioxide.

*Example 10.—5-methyl-3-ethyl-6-sulfamyl-1,2-benzisothiazole-1,1-dioxide*

By replacing the m-chlorotoluene employed in Example 1 by an equimolecular quantity of meta-xylene and following substantially the same procedure described in Example 1, Steps A through D, there is obtained 5-methyl-3-ethyl-6-sulfamyl-1,2-benzisothiazole-1,1-dioxide.

*Example 11.—5-methyl-3-ethyl-6-sulfamyl-2,3-dihydro-1,2-benzisothiazole-1,1-dioxide*

The 5-methyl-3-ethyl-6-sulfamyl-1,2-benzisothiazole-1,1-dioxide obtained as described in Example 10 is reduced by substantially the same method described in Example 2 to give 5-methyl-3-ethyl-6-sulfamyl-2,3-dihydro-1,2-benzisothiazole-1,1-dioxide.

*Example 12.—5-butyl-3-ethyl-6-sulfamyl-1,2-benzisothiazole-1,1-dioxide*

By replacing the m-chlorotoluene employed in Example 1 by an equimolecular quantity of m-butyltoluene and following substantially the same procedure described in Example 1, Steps A through D, there is obtained 5-butyl-3-ethyl-6-sulfamyl-1,2-benzisothiazole-1,1-dioxide.

*Example 13.—5-butyl-3-ethyl-6-sulfamyl-2,3-dihydro-1,2-benzisothiazole-1,1-dioxide*

The 5-butyl-3-ethyl-6-sulfamyl-1,2-benzisothiazole-1,1-dioxide obtained as described in Example 12 is reduced by substantially the same procedure described in Example 2 to yield 5-butyl-3-ethyl-6-sulfamyl-2,3-dihydro-1,2-benzisothiazole-1,1-dioxide.

*Example 14.—5 - ethoxy-3-butyl-6-sulfamyl-1,2-benzisothiazole-1,1-dioxide*

By replacing the m-chlorotoluene employed in Example 1 by an equimolecular quantity of m-ethoxytoluene and following substantially the same procedures described in Example 1, Steps A through C, there is obtained 5-ethoxy-6-sulfamylsaccharin. This compound then is reacted with the Grignard reagent, butylmagnesium bromide, in tetrahydrofuran by substantially the same method described in Example 1, Step D, to give 5-ethoxy-3-butyl-6-sulfamyl-1,2-benzisothiazole-1,1-dioxide.

*Example 15.—5-ethoxy-3-butyl-6-sulfamyl-2,3-dihydro-1, 2-benzisothiazole-1,1-dioxide*

The 5-ethoxy-3-butyl-6-sulfamyl-1,2-benzisothiazole-1,1-dioxide obtained as described in Example 14 is reduced by substantially the same procedure described in Example 2 to yield 5-ethoxy-3-butyl-6-sulfamyl-2,3-dihydro-1,2-benzisothiazole-1,1-dioxide.

*Example 16.—5 - butoxy-3-ethyl-6-sulfamyl-1,2-benzisothiazole-1,1-dioxide*

By replacing the m-toluene employed in Example 1 by an equimolecular quantity of m-butoxytoluene and following substantially the same procedures described in Example 1, Steps A through D, there is obtained 5-butoxy-3-ethyl-6-sulfamyl-1,2-benzisothiazole-1,1-dioxide.

*Example 17.—5-butoxy-3-ethyl-6-sulfamyl-2,3-dihydro-1, 2-benzisothiazole-1,1-dioxide*

The 5-butoxy-3-ethyl-6-sulfamyl-1,2-benzisothiazole-1,1-dioxide obtained as described in Example 16 is reduced by substantially the same procedure described in Example 2 to give 5-butoxy-3-ethyl-6-sulfamyl-2,3-dihydro-1,2-benzisothiazole-1,1-dioxide.

*Example 18.—5-nitro-3-ethyl-6-sulfamyl-1,2-benziosothiazole-1,1-dioxide*

By replacing the m-chlorotoluene employed in Example 1 an equimolecular quantity of m-nitrotoluene and following substantially the same procedure described in Example 1, Steps A through D, there is obtained 5-nitro-3-ethyl-6-sulfamyl-1,2-benzisothiazole-1,1-dioxide.

*Example 19.*—The 5-nitro-3-ethyl-6-sulfamyl-1,2-benzisothiazole-1,1-dioxide obtained as described in Example 18 can be catalytically reduced to form 5-amino-3-ethyl-6 - sulfamyl-1,2-benzisothiazole-1,1-dioxide. This latter compound in turn can be reduced by substantially the same procedure described in Example 2 to give 5-amino-3 - ethyl-6-sulfamyl-2,3-dihydro-1,2-benzisothiazole-1,1-dioxide.

*Example 20.—6-chloro-3-ethyl-5-sulfamyl-1,2-benzisothiazole-1,1-dioxide*

4-chlorotoluene-2,5-disulfonyl chloride (0.5 mole) is added portionwise to 150 ml. of 28% ammonium hydroxide cooled in an ice bath. The mixture then is heated on a steam bath for two hours after which the mixture is cooled and the product which precipitates is collected on the filter and recrystallized from aqueous alcohol to give 4-chloro-2,5-disulfamyltoluene.

*Step B.*—By replacing the 5-chloro-2,4-disulfamyltoluene employed in Example 1, Step B, by an equimolecular quantity of the 4-chloro-2,5-disulfamyltoluene prepared as described above, and following substantially the same procedure described in Example 1, Steps B through D, there is obtained 6-chloro-3-ethyl-5-sulfamyl-1,2-benzisothiazole-1,1-dioxide.

*Example 21.—6-chloro-3-ethyl-5-sulfamyl-2,3-dihydro-1, 2-benzisothiazole-1,1-dioxide*

An alkaline solution of the 6-chloro-3-ethyl-5-sulfamyl-1,2-benzisothiazole-1,1-dioxide obtained as described in Example 20, is reduced by substantially the same method described in Example 2 to give 6-chloro-3-ethyl-5-sulfamyl-2,3-dihydro-1,2-benzisothiazole-1,1-dioxide.

*Example 22.—3-ethyl-6-sulfamyl-1,2-benzisothiazole-1,1-dioxide*

By replacing the m-chlorotoluene employed in Example 1 by an equimolecular quantity of toluene and following substantially the same procedures described in Example 1, Steps A through D, there is obtained 3-ethyl-6-sulfamyl-1,2-benzisothiazole-1,1-dioxide.

*Example 23.—3-ethyl-6-sulfamyl-2,3-dihydro-1,2-benzisothiazole-1,1-dioxide*

An alkaline solution of the 3-ethyl-6-sulfamyl-1,2-benzisothiazole-1,1-dioxide obtained as described in Example 22 is reduced by substantially the same procedure described in Example 2 to give 3-ethyl-6-sulfamyl-2,3-dihydro-1,2-benzisothiazole-1,1-dioxide.

The compounds of this invention are effective diuretic and/or saluretic agents. Because of this property they are useful in therapy for the treatment of any condition resulting from an excessively high concentration of sodium in the body such as in the treatment of edematous conditions resulting, for example, from congestive heart failure. The dosage of the novel compounds of this invention will vary over a wide range and for this reason, tablets, pills, capsules and the like containing 100, 150, 250 and 500 mgms. of the active ingredient can be made available to the physician for the symptomatic adjustment of the dosage to the individual patient. These dosages are well below the toxic or lethal dose of the compounds covered by this invention.

As each of the compounds of this invention can be incorporated in a dosage form similar to that described in the following example or in other dosage forms suitable for oral or parenteral administration for use in therapy which can be prepared by well known methods only one example is included herein to illustrate the preparation of a representative dosage form.

*Example 24.—Dry-filled capsules containing 150 mg. active ingredient per capsule*

Mg. per capsule
5-chloro-3-ethyl-6-sulfamyl - 1,2-benzisothiazole-1,1-dioxide _____ 150
Lactose _____ 125
Capsule size No. 2.

The 5-chloro-3-ethyl-6-sulfamyl-1,2-benzisothiazole-1,1-dioxide is reduced to a No. 60 powder. Lactose then is passed through a No. 60 bolting cloth onto the powder, the combined ingredients are admixed for 10 minutes and then filled into a No. 2 dry gelatin capsule.

While the above examples describe the preparation of certain compounds which are illustrative of the novel compounds, of this invention, and a certain specific dosage form suitable for administering the novel compounds, it is to be understood that the invention is not to be limited by the examples or by the specific reaction conditions described for the preparation of the compounds, or by the specific ingredients included in the pharmaceutical preparation but is to be understood to embrace variations and modifications thereof which fall within the scope of the appended claims.

What is claimed is:

1. Benzisothiazole compounds selected from the group consisting of compounds having the formula

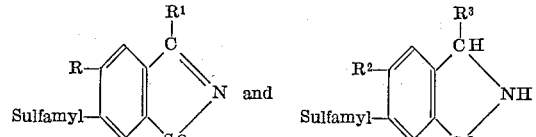

wherein R is selected from the group consisting of hydrogen, halogen, lower alkyl, lower alkoxy, nitro and amino; $R^1$ is selected from the group consisting of lower alkyl, phenyl, and phenyl-lower alkyl; and $R^2$ is selected from the group consisting of hydrogen, halogen, lower alkyl, lower alkoxy and amino; and $R^3$ is selected from the group consisting of hydrogen, lower alkyl, phenyl and phenyl-lower alkyl.

2. 5-halogen-3-lower alkyl-6-sulfamyl-1,2 - benzisothiazole-1,1-dioxide.

3. 5-chloro-3-ethyl - 6 - sulfamyl - 1,2 - benzisothiazole-1,1-dioxide.

4. 5-halogen-3-phenyl-6-sulfamyl - 1,2-benzisothiazole-1,1-dioxide.

5. 5-chloro-3-phenyl-6-sulfamyl - 1,2 - benzisothiazole-1,1-dioxide.

6. 5-halogen-3-lower alkyl-6-sulfamyl-2,3-dihydro-1,2-benzisothiazole-1,1-dioxide.

7. 5-chloro-3-ethyl - 6 - sulfamyl-2,3-dihydro-1,2-benzisothiazole-1,1-dioxide.

8. 5-halogen-3-phenyl - 6 - sulfamyl - 2,3 - dihydro-1,2-benzisothiazole-1,1-dioxide.

9. 5-chloro - 3 - phenyl - 6 - sulfamyl - 2,3 - dihydro-1,2-benzisothiazole-1,1-dioxide.

10. 3,5-di-lower alkyl - 6-sulfamyl-1,2-benzisothiazole-1,1-dioxide.

11. 3,5-di-lower-alkyl - 6 - sulfamyl - 2,3 - dihydro-1,2-benzisothiazole-1,1-dioxide.

12. 5-lower alkoxy-3-lower alkyl-6-sulfamyl-1,2-benzisothiazole-1,1-dioxide.

13. 5-lower alkoxy-3-lower alkyl-6-sulfamyl-2,3-dihydro-1,2-benzisothiazole-1,1-dioxide.

14. 5-chloro-6-sulfamyl-2,3-dihydro - 1,2 - benzisothiazole-1,1-dioxide.

15. A compound of the formula

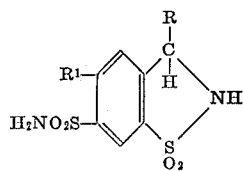

wherein R is selected from the group consisting of hydrogen, lower alkyl, and phenyl, and $R^1$ is selected from the group consisting of hydrogen, halogen, lower alkoxy, and amino.

References Cited by the Examiner

UNITED STATES PATENTS

| | | | |
|---|---|---|---|
| 2,134,714 | 11/1938 | Glassman | 167—65 |
| 2,873,275 | 2/1959 | Ramsden | 260—297 |
| 2,921,940 | 1/1960 | Ramsden | 260—297 |
| 2,949,399 | 8/1960 | Lo | 260—301 |
| 2,957,883 | 10/1960 | Novello | 260—301 |

OTHER REFERENCES

Frear et al.: "J. of Economic Entomology," vol. 40, pp. 736–7, 1949.

Kharasch et al.: "Grignard Reactions of Non-Metallic Substances," p. 878, 1954.

NICHOLAS S. RIZZO, *Primary Examiner.*

IRVING MARCUS, DUVAL T. McCUTCHEN, WALTER A. MODANCE, *Examiners.*